May 25, 1937. M. M. CUNNINGHAM ET AL 2,081,578
BRAKE MATERIAL AND PROCESS CONNECTED THEREWITH
Filed May 2, 1932

INVENTORS
Marion M. Cunningham.
Charles E. Bradley.
BY Jerome R. Cox
ATTORNEY.

Patented May 25, 1937

2,081,578

UNITED STATES PATENT OFFICE 2,081,578

BRAKE MATERIAL AND PROCESS CONNECTED THEREWITH

Marion M. Cunningham and Charles E. Bradley, South Bend, Ind., assignors to Bendix Aviation Corporation, South Bend, Ind., a corporation of Delaware, and Mishawaka Rubber and Woolen Manufacturing Company, Mishawaka, Ind., a corporation of Indiana Application May 2, 1932, Serial No. 608,787

1 Claim. (Cl. 106—23)

This invention relates to brake materials and processes connected therewith. In particular, it relates to a compound for filling any spaces which may exist between the metal brake band or shoe and the lining and for providing a solid foundation for the lining.

In servicing brakes where relining is necessary, we have found it advisable to have some material to apply on the metal brake band or shoe to smooth its surface where it may have been pitted from wear and to correct its curvature where it may have been distorted through service, in order that the brake lining will fit snugly and have a smooth solid base for attachment. Such materials will not work satisfactorily if they run under pressure or heat or if they vulcanize with the metal.

One of the objects of this invention is to provide a suitable compound for filling the spaces between a metallic brake element and an associated brake lining whereby a solid base on which the brake lining may rest is provided.

A further object is to provide processes of forming and using such a compound.

A more specific object of the invention is to provide such a compound which can be satisfactorily hardened, which will not adhere to the metal, and which will not subsequently be affected by heat.

A further object of the invention is to provide such a material which will dry quickly after application.

Further objects of the invention will be apparent after a reading of the subjoined specification and claim and after a consideration of the attached drawing, in which:

Figure 1:
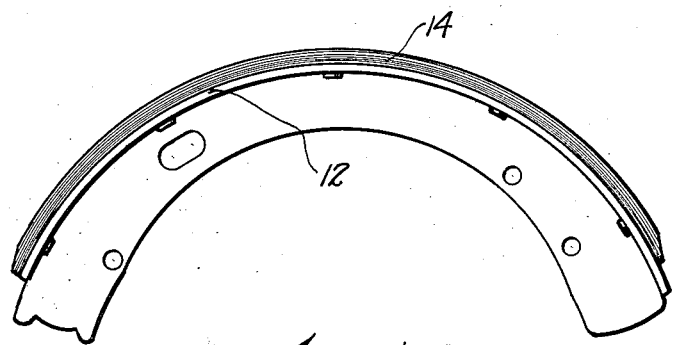
Figure 1 is a side view in elevation of a brake shoe.
Figure 2:
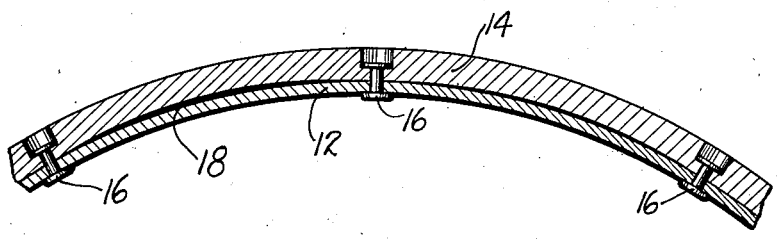
Figure 2 is a view in vertical section and on an enlarged scale of the shoe shown in Figure 1.

It may be seen that the shoe illustrated is formed of a metallic band 12 to which there is secured a strip of brake lining 14 by means of rivets 16. Interposed between the band 12 and the lining 14 is a mortar 18.

The mortar used in attaching the liner 14 to the band 12 is preferably formed as follows: We thoroughly mix 77 parts rubber, 112 parts asbestos fiber, 28 parts graphite, 28 parts zinc oxide, and 42 parts sulphur (all being parts by weight). Thereafter, we introduce the mixture into a cement churn together with 368 parts gasoline and 22 parts of a phenolic resin, the latter being preferably a compound made from phenol and formaldehyde. The mixture is stirred in the churn for approximately 12 hours until it is thoroughly dissolved to a uniform paste-like mortar.

The mortar produced by this process is spread upon the surface of the metallic brake band as a paint and immediately thereafter the brake lining is applied to the band and forced tightly into contact therewith so that the mortar is forced into any space which might otherwise be left between the band and the lining. The lining is then riveted to the band. While we prefer to use the mortar described above, we have found that lead oxide paint or zinc oxide paint may be substituted for the compound described and used in a process similar to that described, whereupon very fair results are obtained, the paint serving as a mortar.

The high percentage of sulphur in this compound vulcanizes the material slowly into hard rubber under application of heat, the heat being furnished by the friction on the brake lining and the cooperating surface. The phenolic resin insures that the mortar shall dry quickly and have a quick setting or stiffening. The shrinkage or loss from evaporation is very low due to the relatively small content of solvent.

The compound described has many advantages including the following: It will not run out during the process of applying the band; it will dry quickly and the relining operation may be accomplished quickly, this being an effect of the phenolic resin. Under the influence of the heat of application, it becomes homogeneous with the lining, thereafter not being affected by heat. It forms a solid base for the lining to rest upon. It is to be noted that the compound, when dry, is very similar to that of the brake lining itself which aids in accomplishing the homogeneity of the lining and the mortar.

It is to be understood that the above described embodiment of the invention is for the purpose of illustration only and various changes may be made therein without departing from the spirit and scope of the invention.

We claim:

A composition of matter for use in applying friction brake lining to metal brake shoes comprising a compound including by weight approximately 77 parts rubber, 112 parts asbestos fiber, 28 parts graphite, 28 parts zinc oxide, and 42 parts sulphur thoroughly mixed and treated with approximately 368 parts of gasoline and 22 parts of phenol resin to form a thoroughly dissolved uniform paste-like mortar.

MARION M. CUNNINGHAM.
CHARLES E. BRADLEY.